US009377063B2

(12) United States Patent
Yoshino

(10) Patent No.: US 9,377,063 B2
(45) Date of Patent: Jun. 28, 2016

(54) HYDRAULIC CONTROL DEVICE AND DRIVING FORCE DISTRIBUTION DEVICE FOR FOUR-WHEEL DRIVE VEHICLE PROVIDED WITH THE SAME

(71) Applicant: HONDA MOTOR CO., LTD., Minato-Ku, Tokyo (JP)

(72) Inventor: Hiroki Yoshino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/767,164

(22) PCT Filed: Jan. 29, 2014

(86) PCT No.: PCT/JP2014/052012
§ 371 (c)(1),
(2) Date: Aug. 11, 2015

(87) PCT Pub. No.: WO2014/125926
PCT Pub. Date: Aug. 21, 2014

(65) Prior Publication Data
US 2015/0369307 A1    Dec. 24, 2015

(30) Foreign Application Priority Data

Feb. 15, 2013  (JP) .................................. 2013-028438

(51) Int. Cl.
*F16D 48/06*  (2006.01)
*B60K 23/08*  (2006.01)

(52) U.S. Cl.
CPC .............. *F16D 48/066* (2013.01); *B60K 23/08* (2013.01); *F16D 2500/1045* (2013.01);
(Continued)

(58) Field of Classification Search
None
See application file for complete search history.

(56) References Cited

U.S. PATENT DOCUMENTS 6,891,710 B2    5/2005  Mayr et al.
2008/0021590 A1*  1/2008  Vanko ................... B23B 45/008
                                            700/168
(Continued)

FOREIGN PATENT DOCUMENTS

JP    S61-157439 A    7/1986
JP    H08-093794 A    4/1996
(Continued)

OTHER PUBLICATIONS

Balabin et al., "Near-infrared (NIR) spectroscopy for motor oil classification: From discriminant analysis to support vector machines" Microchemical Journal, 98 (2011) 121-128.
(Continued)

*Primary Examiner* — Edwin A Young
(74) *Attorney, Agent, or Firm* — Carrier Blackman & Associates, P.C.; Joseph P. Carrier; William D. Blackman

(57) ABSTRACT

The hydraulic control device includes a hydraulic fluid temperature estimation means for estimating the temperature of the hydraulic fluid supplied to the hydraulic clutch (actuator). The hydraulic fluid temperature estimation means calculates an output of logistic regression from an integrated value of driving currents and an average value of driving voltage of the electric motor. If the calculated output of the logistic regression is equal to or more than a first threshold value, the hydraulic fluid estimation means calculates a posteriori probability from such output. If the calculated posteriori probability is equal to or more than the second threshold larger than the first threshold value, the hydraulic fluid temperature estimation means determines the posteriori probability to be a final determination result, thereby determining the temperature of the hydraulic fluid to be a predetermined temperature.

6 Claims, 10 Drawing Sheets

(52) U.S. Cl.
CPC ............ *F16D 2500/10431* (2013.01); *F16D 2500/1107* (2013.01); *F16D 2500/3022* (2013.01); *F16D 2500/3028* (2013.01); *F16D 2500/3056* (2013.01); *F16D 2500/3168* (2013.01); *F16D 2500/50287* (2013.01); *F16D 2500/5114* (2013.01); *F16D 2500/7043* (2013.01); *F16D 2500/70406* (2013.01); *F16D 2500/70657* (2013.01); *F16D 2500/70684* (2013.01); *F16D 2500/7109* (2013.01)

(56) References Cited

U.S. PATENT DOCUMENTS

| | | | |
|---|---|---|---|
| 2012/0296512 A1* | 11/2012 | Lee .................... | B60K 6/48 701/29.3 |
| 2013/0052614 A1* | 2/2013 | Mollicone ............ | G09B 19/167 434/65 |

FOREIGN PATENT DOCUMENTS

| | | | |
|---|---|---|---|
| JP | 2003-520934 | A | 7/2003 |
| JP | 2012-224290 | A | 11/2012 |

OTHER PUBLICATIONS

Pradhan et al., "On-line Monitoring of Temperature in Power Transformers using Optimal Linear Combination of ANNs", Dept. of High Voltage Engineering, Indian Institute of Science, Bangalore (India), 2004 IEEE International Symposium on Electrical Insulation, Indianapolis, IN USA, Sep. 19-22, 2004, pp. 70-73.

Tang et al., "Development of Power Transformer Thermal Models for Oil Temperature Prediction", Dept. of Electrical Engineering and Electronics, The University of Liverpool, pp. 195-204, 2000.

He et al., "Prediction of Top-Oil Temperature for Transformers Using Neural Networks", IEEE Transactions on Power Delivery, vol. 15, No. 4, Oct. 2000, pp. 1205-1211.

Wang et al., "Artificial Intelligence in OLTC Fault Diagnosis Using Dissolved Gas-In-Oil Information", Dept. of Electrical Engineering Virginia Tech, Blacksburg, VA and Doble Engineering Company, Watertown, MA, 2000 IEEE, pp. 2422-2427.

* cited by examiner

HYDRAULIC CONTROL DEVICE AND DRIVING FORCE DISTRIBUTION DEVICE FOR FOUR-WHEEL DRIVE VEHICLE PROVIDED WITH THE SAME

TECHNICAL FIELD

The present invention relates to a hydraulic control device and a driving force distribution device for a four-wheel drive vehicle provided with such hydraulic control device. The hydraulic control device includes a hydraulic fluid temperature estimation means for estimating a temperature of hydraulic fluid supplied to an actuator, and controls the actuator using hydraulic pressure of the hydraulic fluid supplied from an oil pump driven by an electric motor.

BACKGROUND ART

A kind of four-wheel drive vehicle is provided with a driving force distribution device for distributing a driving force generated in a driving source such as an engine to main driving wheels and auxiliary driving wheels. In this kind of four-wheel drive vehicle in which the main driving wheels are front wheels and the auxiliary driving wheels are rear wheels, for example, the driving force generated in the driving source is transmitted to the front wheels via a front drive shaft and a front differential. The driving force is also transmitted to the driving force distribution device provided with a hydraulic clutch via a propeller shaft. Then, supplying hydraulic fluid under a predetermined pressure from the hydraulic control device to the driving force distribution device controls an engagement pressure of the hydraulic clutch included by the driving force distribution device. This allows the driving force of the driving source to transmit at a predetermined distribution ratio to the rear wheels that are the auxiliary driving wheels.

In the above-described hydraulic clutch of the driving force distribution device, a friction coefficient of the hydraulic clutch increases at a low temperature of the hydraulic fluid supplied to the hydraulic clutch. This makes torque transmitted to the rear wheels excessive. This torque might exceed a target strength of the hydraulic clutch. The hydraulic control device estimates a temperature of the hydraulic fluid so as to be lower than an actual temperature, and limits a controlled amount of the hydraulic clutch until the estimated temperature exceeds a specified temperature. In this way, the hydraulic control device prevents the torque exceeding the target strength from occurring to the hydraulic clutch. This necessitates estimation of the temperature of the hydraulic fluid supplied to the hydraulic clutch as accurately as possible.

Regarding this necessity, various estimation techniques and determination techniques have been conventionally proposed for measuring a physical quantity of the hydraulic fluid (oil). Among these techniques, preceding studies suggest effectiveness of a technique using machine learning. The machine learning technique is capable of model construction only with data desired to be modeled. Therefore, this technique has a merit to construct a model even without much knowledge and information about an internal structure of a target system. Balabin et al. propose techniques to discriminate between mineral oil and synthetic fluid in engine oil and determine viscosity of the engine oil. These techniques are acquired by applying identification methods such as the k-neighborhood method (k-NN), an artificial neural network (ANN) and a support vector machine (SVM) to absorption spectrum data achieved using the near-infrared spectroscopy. These techniques are disclosed in Non-patent document 1.

Further, multiple studies report a technique for estimating a temperature of insulating oil in an oil-immersed transformer. This estimation uses the ANN that has been learned from a load of the transformer and an ambient temperature for estimating the temperature of the insulating oil in the oil-immersed transformer. This technique is disclosed in Non-patent documents 2 to 4. Similarly, another study covers the oil-immersed transformer. In this oil-immersed transformer, a gas composition contained in oil is used as a feature quantity to determine an abnormal state of an on-load tap switching device by applying a logistic regression and the ANN. This technique is disclosed in Non-patent document 5. This document states that an approach applying the ANN is more effective than an approach applying the logistic regression due to better determination accuracy of the ANN than that of the logistic regression.

However, each of the above-described studies proposes the technique that makes a determination using only a one-time output from a model. Therefore, any of these techniques may make an erroneous determination due to variations in a system operation at the time of determination or due to noises in measured data.

Meanwhile, Patent document 1 discloses a technique for detecting a state transition of a plunger position from coil currents. The aim of this technique is to estimate the plunger position in a linear solenoid. It should be noted that the linear solenoid here corresponds to a "proportion magnet," and the state transition here corresponds to a transition between two states that are a "hold-in range" and a "control range" in Patent document 1.

Here, the "hold-in range" in Patent document 1 is a state in which the solenoid is stopped, and the "control range" is a state between a hold-in range and another hold-in range. In other words, the transition of "a state in which the solenoid is open at a target value→the plunger is in motion→a state in which the solenoid is open at another target value" is expressed as "a hold-in range→a control range→another hold-in range" in Patent document 1.

In the case of the transition from the hold-in range to the control range, a coil current rises for an instant immediately after the plunger starts to move. To this coil current that has risen, a threshold value is applied so as to set a next target current after the plunger starts to move. This enables the transition from the hold-in range to the other hold-in range. In other words, a low coil current prior to the plunger motion precludes setting a target coil current before an actual coil current rises.

However, since the technique disclosed in Patent document 1 also employs an algorithm that relies on only a single determination, a determination threshold value must be set at a value high enough to prevent an erroneous determination. Then, a determination of current rise is delayed, thereby possibly failing to control a plunger position if, for example, hold-in ranges before and after a transition are close to each other. On the contrary, a low determination threshold value increases possibility of the erroneous determination.

As described above, many conventional techniques for detecting oil properties have been proposed. However, many of them claim that a high-performance model with a large amount of calculation can ensure a highly accurate estimation and determination. Therefore, many of these techniques are difficult to be implemented to an on-vehicle unit that has moderate calculation capability but is required to process in real time.

In a system required to be highly reliable such as an on-vehicle system, reliability of a result derived from a determination and estimation algorithm is essential. However, almost all techniques including the above-described conventional ones have not been discussed in terms of reliability. In addition, one can conceive of a commonly used technique that relies on a determination and estimation result detected multiple times. However, this technique needs to examine how to quantitatively evaluate a reliable number of times for every object to be detected. Furthermore, the above-described techniques entail a trade-off, that is, "a higher determination threshold value increases reliability of a result, but decreases detection frequency," and "a lower determination threshold value increases detection frequency, but decreases reliability of a result." This requires to set a threshold value in consideration of such trade off.

RELATED ART DOCUMENTS

Patent Documents

[Patent document 1] Japanese Translation of PCT International Application Publication No. 2003-520934.

Non-Patent Documents

[Non-patent document 1] Balabin, R. M., Safieva, R. Z., Lomakina, E. I.: Near-infrared (NIR) spectroscopy for motor oil classification: From discriminant analysis to support vector machines, Microchemical Journal, Vol. 98, p. 121-128 (2011).
[Non-patent document 2] Pradhan, M. K., Ramu, T. S.: On-line Monitoring of Temperature in Power Transformers using Optimal Linear Combination of ANNs, Conference Record of the 2004 IEEE International Symposium on Electrical Insulation, pp. 70-73 (2004).
[Non-patent document 3] Tang, W. H., Zeng, H., Nuttall, K. I., Richardson, Z., Simonson, E., Wu, Q. H.: Development of Power Transformer Thermal Models for Oil Temperature Prediction, Real-World Applications of Evolutionary Computing, EvoWorkshops 2000, Lecture Notes in Computer Science, Vol. 1803, pp. 195-204 (2000).
[Non-patent document 4] He, Q., Si, J., Tylaysky, D. J.: Prediction of Top-Oil Temperature for Transformers Using Neural Networks, IEEE Transactions on Power Delivery, Vol. 15, No. 4, pp. 1205-1211 (2000).
[Non-patent document 5] Wang, H., Liu, lateral Griffin, P. J.: Artificial Intelligence in OLTC Fault Diagnosis Using Dissolved Gas-In-Oil Information, Power Engineering Society Summer Meeting, Vol. 4, pp. 2422-2427 (2000).

DISCLOSURE OF THE INVENTION

Problems to be Solved by the Invention

The present invention was made in view of a point of the above-mentioned, and the purpose is to provide a hydraulic control device that can highly accurately detect a temperature of hydraulic fluid supplied to a hydraulic actuator with an easy configuration and a simple control, and a driving force distribution device for a four-wheel drive vehicle provided with such hydraulic control device.

Means of Solving the Problems

In order to solve above-described problems, a hydraulic control device according to the present invention includes an electric motor (37), an oil pump (35) that is driven by the electric motor (37) and a control means (50) that controls an operation of the electric motor (37). The hydraulic control device controls an operation of an actuator (10) using hydraulic pressure of hydraulic fluid supplied from the oil pump (35). The hydraulic control device also includes a hydraulic fluid temperature estimation means (50) for estimating a temperature of the hydraulic fluid supplied to the actuator (10). The hydraulic fluid temperature estimation means (50) calculates an output of a logistic regression from an integrated value of driving currents of the electric motor (37) and an average value of driving voltage of the electric motor (37). Then, on the basis of the calculated output of the logistic regression, the hydraulic fluid temperature estimate means (50) estimates the temperature of the hydraulic fluid. The control means (50) controls the operation of the actuator (10) on the basis of the hydraulic fluid temperature that has been estimated using the hydraulic fluid temperature estimation means (50). In other words, here, on the basis of the motor current integrated value and the motor voltage, the logistic regression, which is a linear model, ensures a binary determination of a hydraulic fluid temperature state with high accuracy and a smaller calculation amount.

Further, if the calculated output of the logistic regression is equal to or more than a first threshold value (L), the hydraulic fluid temperature estimation means (50) stores such calculated output in a memory means as a posteriori probability for a one-time input. Then, if a posteriori probability given multiple-time inputs calculated from multiple-time outputs of the logistic regression stored in the memory means becomes equal to or more than a second threshold value (H), which is more than the first threshold value (L), the hydraulic fluid temperature estimate means (50) determines such posteriori probability to be a final determination result. By doing so, the hydraulic fluid temperature estimate means (50) should determine that the temperature of the hydraulic fluid is equal to a predetermined temperature. In other words, if a predetermined state is detected multiple times only using the multiple-time outputs of the logistic regression, the hydraulic fluid temperature estimate means (50) is configured to determine the posteriori probability, which is reliability of these outputs, to be the final determination result.

A system covered by the present invention pressurizes using the oil pump driven by the electric motor to control the operation of the actuator. Therefore, a correlation exists between the hydraulic fluid temperature and the motor current. Using such correlation, the present invention has devised an algorithm for determining whether the hydraulic fluid temperature is equal to a specific temperature from the motor current integrated value and the motor driving voltage. This determination algorithm employs the logistic regression. Then, in order to achieve compatibility between determination accuracy and determination frequency, a technique has been devised to calculate the posteriori probability for the consecutive and multiple-time determinations only from the output value of the logistic regression.

As described above, the conventional calculation techniques entail the trade-off, that is, a lower determination threshold value increases possibility of an erroneous determination, and a higher determination threshold makes a determination more difficult. In order to solve such trade-off, the algorithm of the present technique calculates the posteriori probability using multiple-time determination results for the multiple input data, without determining each determination result independently. Here, the posteriori probability can be interpreted as reliability of these determination results. Then, the algorithm sets a threshold value to this posteriori probability to make a final determination. Consequently, on one hand, an output determination result with high reliability is reliable to immediately output the final determination result. On the other hand, the multiple-time output determination results with normal reliability are reliable to output a final determination result. This enables the compatibility between determination accuracy and determination frequency. Specifically, the two kinds of determination threshold values are provided. The one is the threshold value (normal threshold value) for running the logistic regression one time. The other is the threshold value (higher threshold value) for the multiple-time determination results. This enables the two ways of determination. The one is for the multiple-time determinations exceeding the normal threshold value. The other is for the one-time determination exceeding the higher threshold value.

In other words, using the logistic regression as a determination technique for the hydraulic fluid temperature of the hydraulic fluid, the present invention has devised a technique for quantitatively evaluating reliability of multiple-time detections in the form of posteriori probability. Furthermore, the present invention provides the two kinds of determination threshold values for determination. The one is "the normal threshold value." The other is "the highly-reliable threshold value." With these two kinds of determination threshold values, the present invention can solve an existing trade-off: "For consecutive outputs with normal reliability, reliability of these outputs is calculated to make a final determination with multiple-time detections. For highly reliable outputs, a final determination is made fewer times than these multiple-time detections." In addition, the above-described determination technique provides the algorithm executable only from calculation results of the logistic regression. This can improve determination accuracy without damaging a feature of this technique, that is, a small calculation amount.

In the above-described hydraulic control device, the actuator is a hydraulic clutch, which engages by hydraulic pressure of the hydraulic fluid. On one hand, if an estimated temperature of the hydraulic fluid estimated using the hydraulic fluid temperature estimation means is lower than a first temperature, the control means should limit a controlled amount of the hydraulic clutch until the estimated temperature exceeds the first temperature. On the other hand, if the estimated temperature of the hydraulic fluid is equal to or more than a second temperature that is higher than the first temperature, the control means should control to reduce hydraulic pressure supplied to the hydraulic clutch and release the hydraulic clutch.

With this configuration, the hydraulic control means can prevent a decrease in a temperature of the hydraulic clutch and avoid torque exceeding a target strength from occurring to the hydraulic clutch. The hydraulic control means can also prevent an extreme rise in the temperature of the hydraulic clutch and carbonization of friction materials.

Further, the driving force distribution device for the four-wheel drive vehicle according to the present invention includes a driving force transmission route and the hydraulic clutch. The driving force transmission route transmits a driving force from a driving source to main driving wheels and auxiliary driving wheels. The hydraulic clutch is arranged between the driving source in the driving force transmission route and the auxiliary driving wheels to control the driving force distributed to the auxiliary driving wheels. As a hydraulic control device for controlling an operation of the hydraulic clutch, the driving force distribution device includes either one of the above-described hydraulic control devices in accordance with the present invention. It should be noted that the bracketed reference numerals are examples of the elements of the embodiment described later.

Effects of the Invention

The hydraulic control device and the driving force distribution device for the four-wheel drive vehicle according to the present invention can highly accurately determine the temperature of the hydraulic fluid supplied to the hydraulic actuator with an easy configuration and a simple control.

MODE FOR CARRYING OUT THE INVENTION

Figure 1:
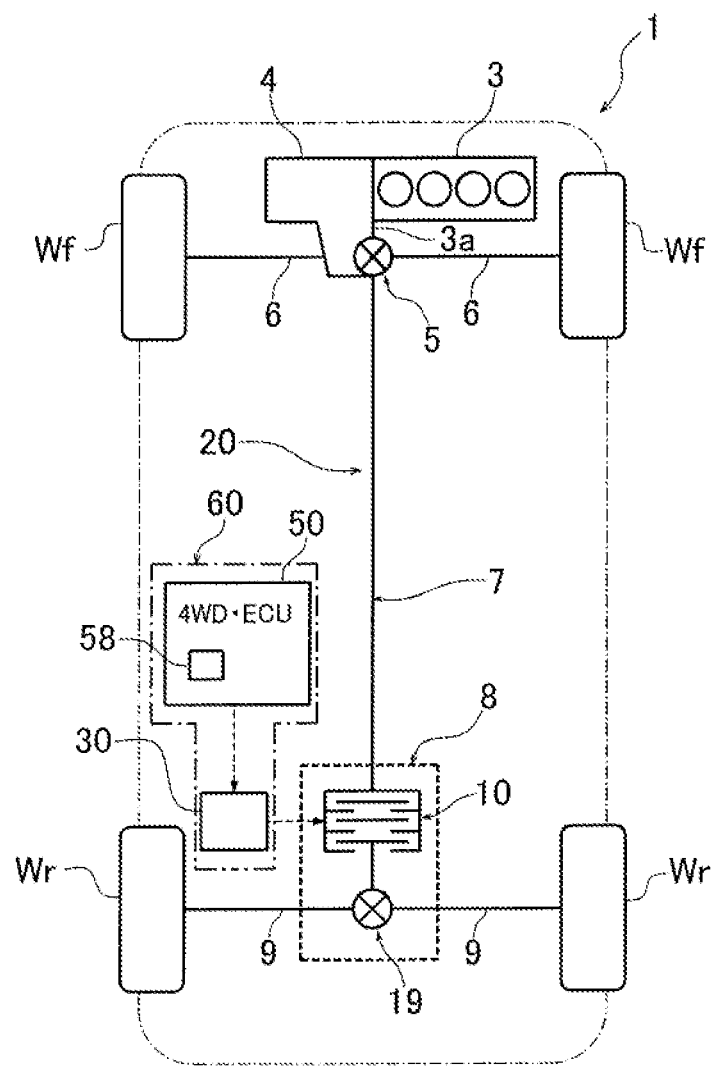
FIG. 1 is a figure illustrating a schematic configuration of a four-wheel drive vehicle provided with a driving force distribution device according to one embodiment of the present invention.

An embodiment of the present invention will now be described in detail with reference to the accompanying drawings. FIG. 1 is a diagram illustrating a schematic configuration of a four-wheel drive vehicle provided with a hydraulic control device and a driving force distribution device according to one embodiment of the present invention. The four-wheel drive vehicle 1 shown in the same figure includes an engine (driving source) 3, an automatic transmission 4 and a driving force transmission route 20. The engine (driving source) 3 is transversely mounted on the front part of the vehicle. The automatic transmission 4 is disposed integrally with the engine 3. The driving force transmission route 20 transmits a driving force from the engine 3 to front wheels Wf, Wf and rear wheels Wr, Wr.

An output shaft (not shown in the figure) of the engine 3 is coupled to the right and left front wheels Wf, Wf, which are primary driving wheels, via the automatic transmission 4, a front differential (hereinafter referred to as "front diff") 5 and right and left front drive shafts 6, 6. Furthermore, the output shaft of the engine 3 is coupled to the right and left rear wheels Wr, Wr, which are auxiliary driving wheels, via the automatic transmission 4, the front diff 5, a propeller shaft 7, a rear differential unit (hereinafter referred to as "rear diff unit") 8 and right and left rear drive shafts 9, 9.

The rear diff unit 8 is equipped with a rear differential (hereinafter referred to as "rear diff") 19 and a front and rear torque distribution clutch 10. The rear diff 19 distributes the driving force to the left and right rear drive shafts 9, 9. The front and rear torque distribution clutch 10 connects and disconnects the driving force transmission route from the propeller shaft 7 to the rear diff 19. The front and rear torque distribution clutch 10 is an actuator structured by a hydraulic clutch for controlling the driving force distributed to the rear wheels Wr, Wr in the driving force transmission route 20. The front and rear torque distribution clutch 10 also includes a hydraulic circuit 30 and a 4WD-ECU 50. The hydraulic circuit 30 supplies hydraulic fluid to the front and rear torque distribution clutch 10. The 4WD-ECU 50 is a control means for controlling a hydraulic pressure supplied from the hydraulic circuit 30. Hereinafter, the 4WD-ECU 50 will be referred to as "control unit." The control unit 50 includes a microcomputer and other devices. The above-described control unit 50 and the above-described hydraulic circuit 30 constitute a hydraulic control device 60. The hydraulic control device 60 and the front and rear torque distribution clutch 10 constitute a driving force distribution device 70.

Figure 2:
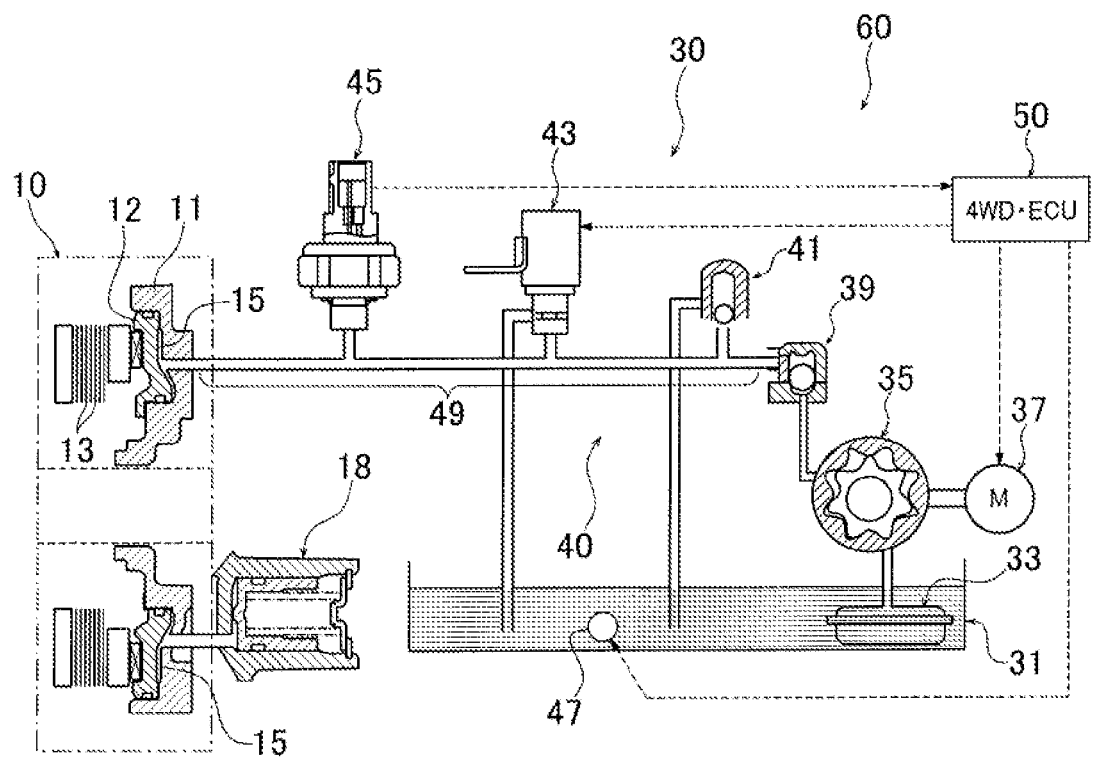
FIG. 2 is a figure illustrating a hydraulic circuit of a hydraulic control device.

FIG. 2 is a figure illustrating a detailed configuration of the hydraulic circuit 30. The hydraulic circuit 30 shown in the same figure includes an oil pump 35, a motor (electric motor) 37 and an oil passage 40. The oil pump 35 pumps up and forcibly feeds the hydraulic fluid accumulated in an oil tank 31 via a strainer 33. The motor (electric motor) 37 drives the oil pump 35. The oil passage 40 communicates to the piston chamber 15 of the front and rear torque distribution clutch 10 (hereinafter, simply referred to as "clutch") 10 from the oil pump 35.

The clutch 10 includes a cylinder housing 11 and a piston 12. The piston 12 advances and retreats in the cylinder housing 11, thereby pressing a plurality of laminated friction materials 13. In the cylinder housing 11, the piston chamber 15 is defined so that the hydraulic fluid is introduced between the piston chamber 15 and the piston 12. The piston 12 is arranged opposite to one end of the plurality of friction materials 13 in a laminated direction. Thus, the piston 12 presses the frictional materials 13 to the laminated direction with a hydraulic pressure of the hydraulic fluid supplied to the piston chamber 15. This allows the clutch 10 to engage with a predetermined engagement pressure.

In the oil passage 40 communicating to the piston chamber 15 from the oil pump 35, a one way valve (unidirectional valve) 39, a relief valve 41, a solenoid valve (on-off valve) 43 and a hydraulic pressure sensor 45 are installed in this order. The one way valve 39 is configured to circulate the hydraulic fluid toward a piston chamber 15 side from an oil pump 35 side, but to prevent the hydraulic fluid from circulating in the reverse direction. This can confine the hydraulic fluid pumped to a downstream side of the one way valve 39 by a drive of the oil pump 35 into the oil passage 49 between the one way valve 39 and the piston chamber 15. Hereinafter, the oil passage may be referred to as "sealed oil passage." The oil passage 49 between the above-described one way valve 39 and the above-described piston chamber 15 constitutes a hydraulic pressure holding part for holding a hydraulic pressure supplied to the clutch 10.

The relief valve 41 is configured to open when a pressure of the oil passage 49 between the one way valve 39 and the piston chamber 15 abnormally exceeds a predetermined threshold value, thereby releasing the hydraulic pressure of the oil passage 49. The hydraulic fluid drained from the relief valve 41 returns to the oil tank 31. The solenoid valve 43 is an on-off type valve that is PWM-controlled (duty-controlled) on the basis of a command from the control unit 50, enabling to control opening and closing of the oil passage 49. Consequently, the solenoid valve can control the hydraulic pressure of the piston chamber 15. It should be noted that the hydraulic fluid drained from the oil passage 49 due to opening of the solenoid valve 43 is configured to return to the oil tank 31. The hydraulic pressure sensor 45 is a hydraulic pressure detection means for detecting the hydraulic pressures of the oil passage 49 and the piston chamber 15. Values detected from the hydraulic pressure sensor 45 are sent to the control unit 50. Further, the piston chamber 15 communicates to an accumulator 18. The accumulator 18 has an effect of suppressing sudden hydraulic pressure changes and hydraulic pulsations in the piston chamber 15 and the oil passage 49. In the oil tank 31, a hydraulic fluid temperature sensor 47 is installed for detecting a temperature of the hydraulic fluid. A value detected from the hydraulic fluid temperature sensor 47 is sent to the control unit 50.

Figure 3:
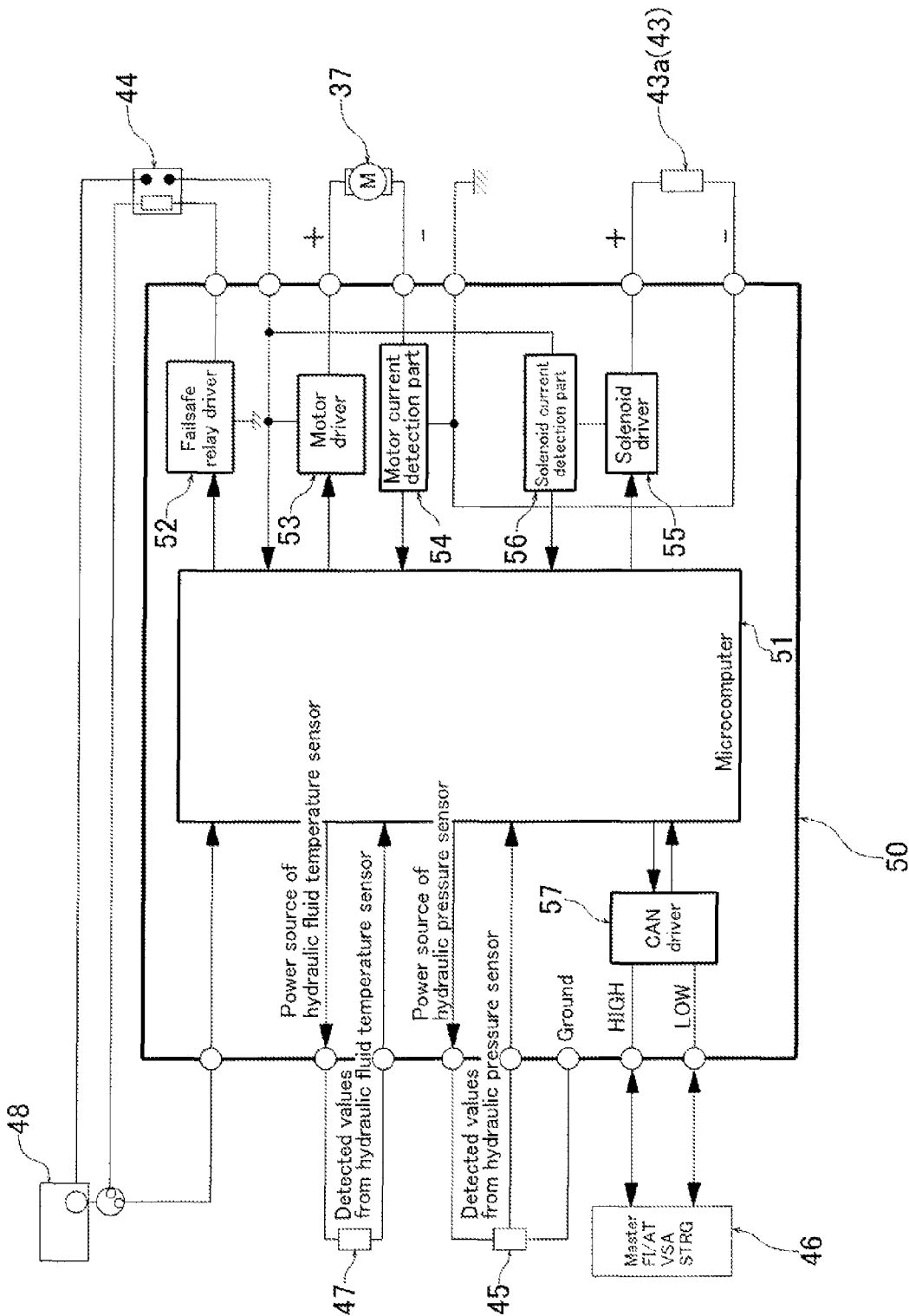
FIG. 3 is a block diagram illustrating a detailed configuration of a control unit (4WD-ECU)

FIG. 3 is a block diagram illustrating a detailed configuration of the control unit 50. To the control unit 50, a terminal of a battery 48 is connected via an ignition switch 42 and a failsafe relay 44. Also, the motor 37, a solenoid (solenoidal coil) 43a of the solenoid valve 43, the hydraulic pressure sensor 45 and the hydraulic fluid temperature sensor 47 are connected to the control unit 50. Also, other control units 46 for controlling each component part of the vehicle are connected to the control unit 50. The other control units include a meter-ECU, an FI/AT-ECU, a VSA-ECU, an STRG-ECU and other devices. The meter-ECU controls various kinds of meters. The FI/AT-ECU controls the engine 3 and the automatic transmission 4. The VSA-ECU controls to stabilize a behavior of the vehicle. And, the STRG-ECU controls steering angles. These devices are not shown in the figure. This specification omits a detailed description of each of the ECUs included in the above-mentioned other control units 46. It should be noted that in FIG. 3, circles (○) placed along the periphery of the control unit 50 correspond to connecting terminals for connecting the control unit 50 to external devices such as the motor 37.

The control unit 50 includes a microcomputer 51, a failsafe relay driver 52, a motor driver 53, a motor current detection part 54, a solenoid driver 55, a solenoid current detection part 56 and a CAN (Controller Area Network) driver 57. The microcomputer 51 is a main control part. The failsafe relay driver 52 controls the failsafe relay 44. The motor driver 53 controls to drive the motor 37. The motor current detection part 54 detects a driving current of the motor 37. The solenoid driver 55 controls to drive the solenoid 43a. The solenoid current detection part 56 detects a driving current of the solenoid 43a. The CAN (Controller Area Network) driver 57 is an interface for connecting the control unit 50 to the other control units 46.

To the control unit 50 of the above-described configuration, a value detected from the hydraulic pressure sensor 45 and the value detected from the hydraulic fluid temperature sensor 47 are input. In addition, the control unit 50 controls to drive the motor 37 using the motor driver 53 and detects the driving current of the motor 37 using the motor current detection part 54. In other words, as a motor operation instruction, duty voltage for a motor operation is output from the microcomputer 51 and, in turn, input to the motor driver 53. This duty voltage for the motor operation drives the motor driver 53. In turn, battery voltage is applied to a plus terminal (+) of the motor 37, thereby operating the motor 37. The motor current detection part 54 measures the driving current of the motor 37 on the basis of shunt resistance.

Further, the control unit 50 controls to drive the solenoid 43a (solenoid valve 43) using the solenoid driver 55, and detects the driving current of the solenoid 43a using the solenoid current detection part 56. In other words, duty voltage for a solenoid operation is output as a solenoid operation instruction from the microcomputer 51 and, in turn, input to the solenoid driver 55. This duty voltage for the solenoid operation drives the solenoid driver 55. In turn, battery voltage is applied to a plus terminal (+) of the solenoid 43a, thereby operating the solenoid 43a. The solenoid current detection part 56 measures the driving current of the solenoid 43a on the basis of shunt resistance. It should be noted that the above-described control unit 50 functions as a control means for controlling an operation of the motor (electric motor) 37 in accordance with the present invention, and also functions as a hydraulic fluid temperature estimation means for estimating a temperature of the hydraulic fluid supplied to the clutch 10 from the oil pump 35. The functions of the control unit 50 as the above-described control means and the above-described hydraulic fluid temperature estimation means will be described later in detail. The control unit 50 has a built-in memory (memory means) 58 for storing data such as an output result of logistic regression, which will be described later.

Figure 4:
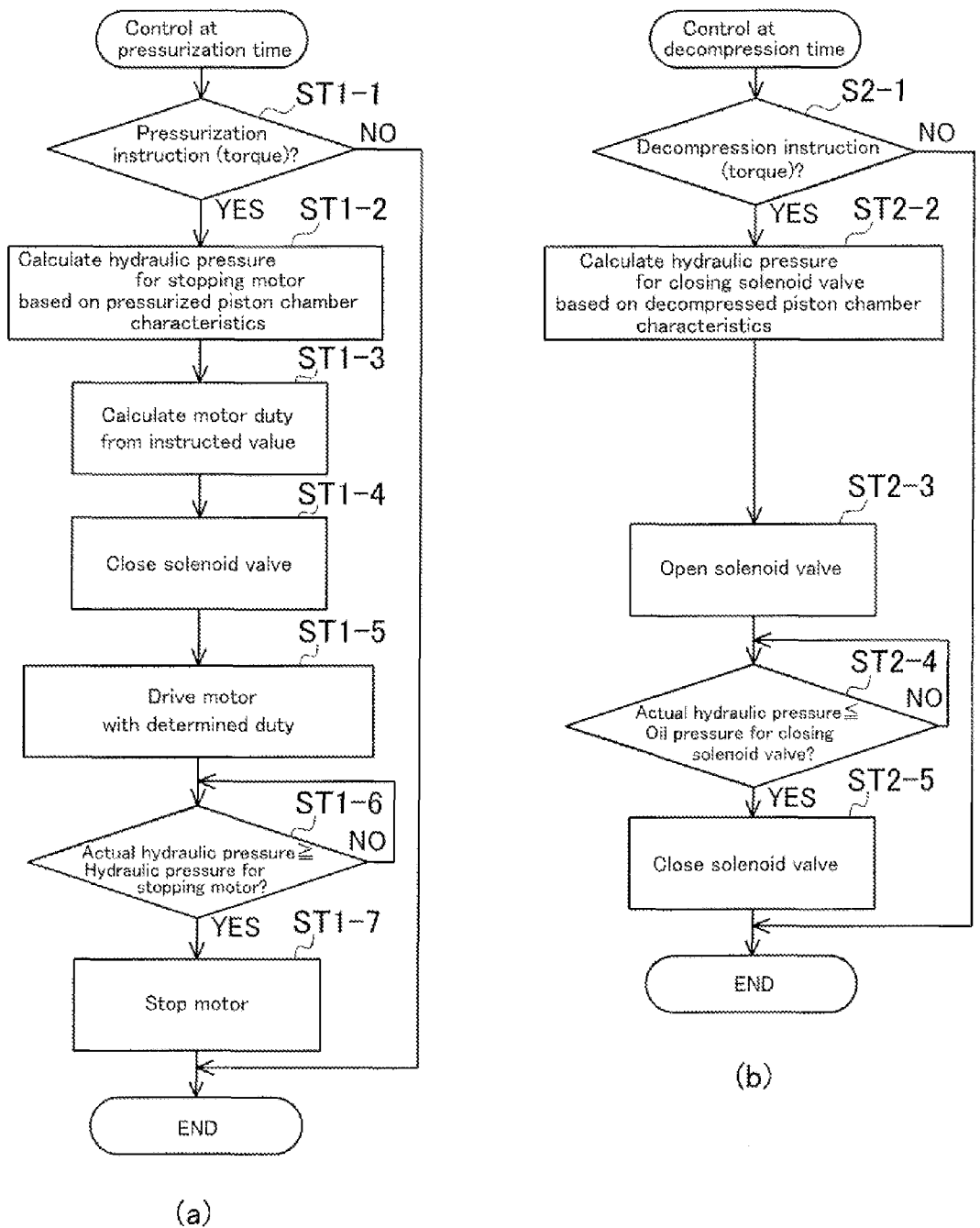
FIGS. 4($a$) and 4($b$) are flow charts illustrating procedures of a hydraulic pressure control of a piston chamber, of which FIG. 4($a$) is the flow chart showing a procedure at a time of pressurization, and FIG. 4($b$) is the flow chart showing a procedure at a time of decompression.
Figure 5:
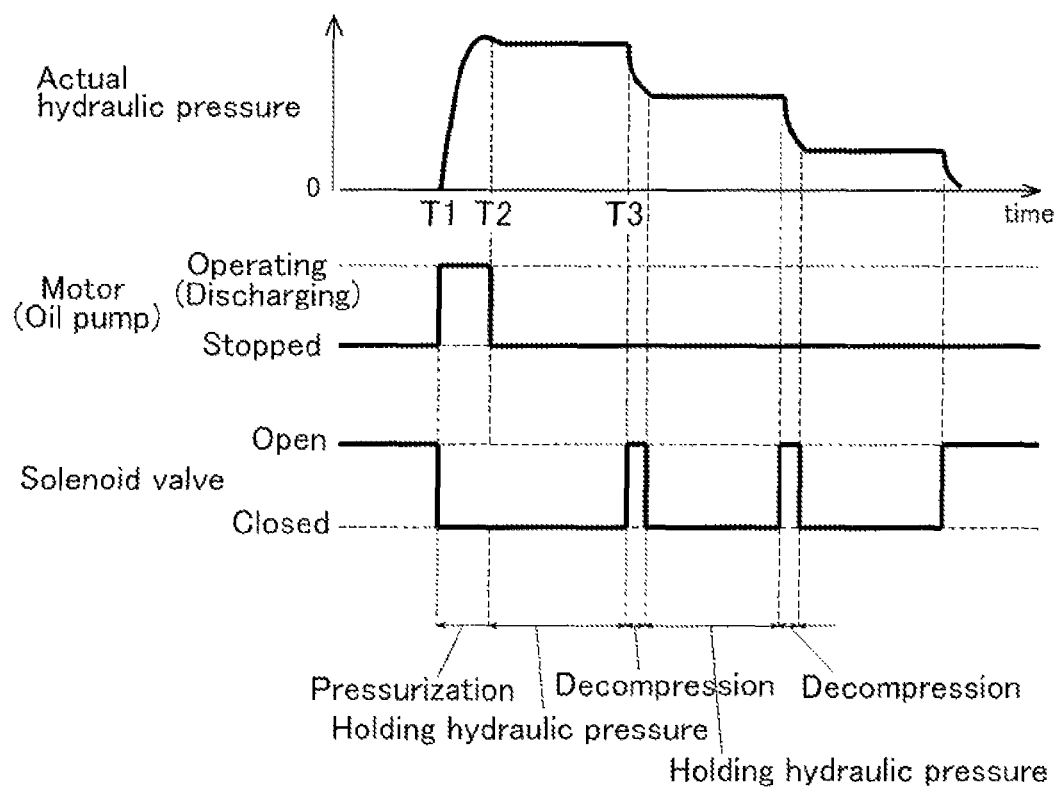
FIG. 5 is a timing chart illustrating operation and stopping of a motor (oil pump) and opening and closing of a solenoid valve for a hydraulic pressure control of a piston chamber and changes in an actual hydraulic pressure.
Figure 6:
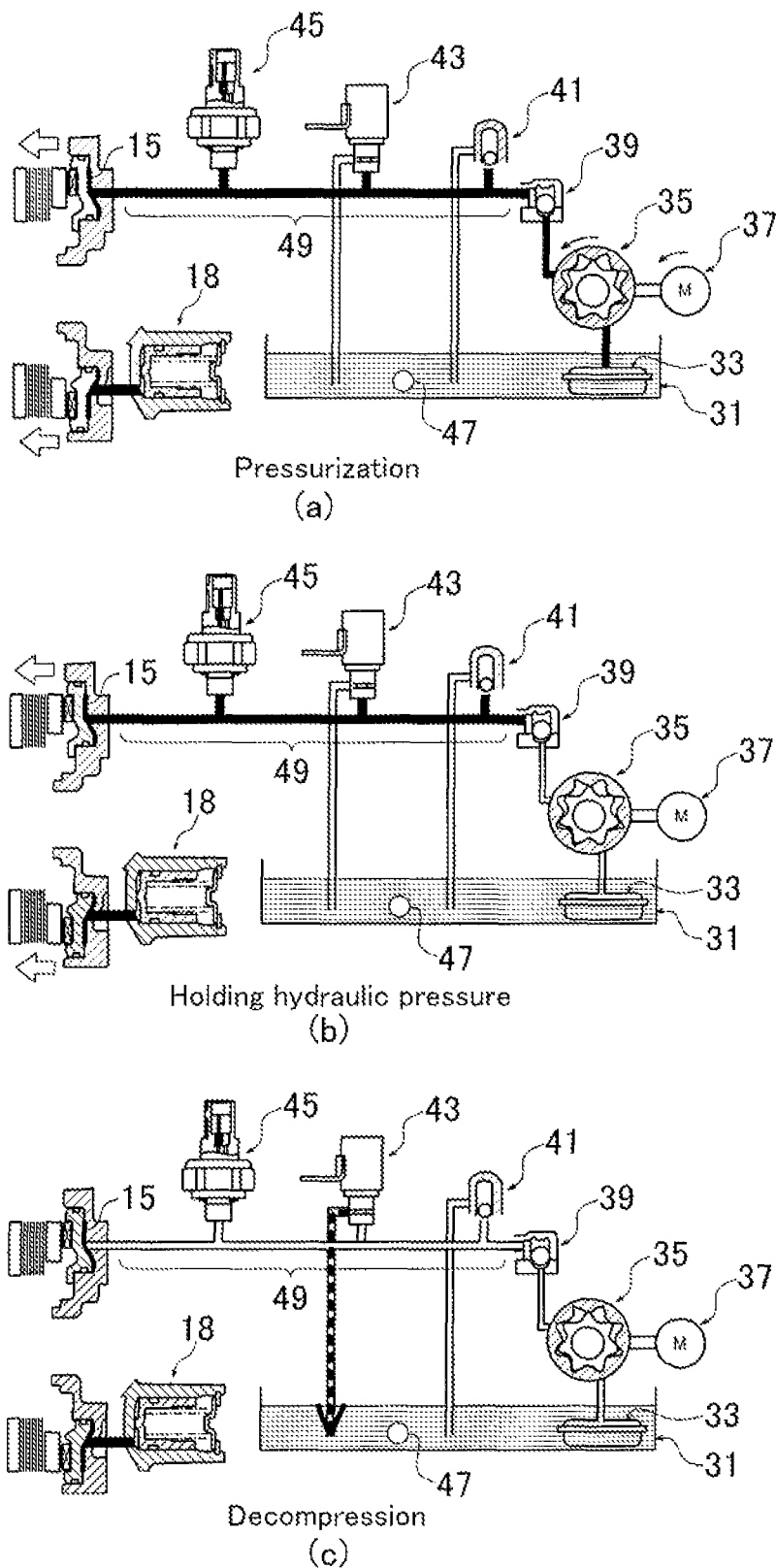
FIGS. 6($a$), 6($b$) and 6($c$) are schematic diagrams illustrating states of hydraulic fluid in a hydraulic circuit for a hydraulic pressure control of a piston chamber, of which FIG. 6($a$) is the diagram showing the state of hydraulic fluid at a time of pressurization, FIG. 6($b$) is the diagram showing the state of hydraulic fluid at a time of holding a hydraulic pressure, and FIG. 6($c$) is the diagram showing the state of hydraulic fluid at a time of decompression.

FIGS. 4(a) and 4(b) are flow charts illustrating procedures of the hydraulic pressure control of the piston chamber. FIG. 4(a) is the flow chart showing the procedure at a time of pressurization. And, FIG. 4(b) is the flow chart showing the procedure at a time of decompression. FIG. 5 is a timing chart illustrating operation and stopping of the motor 37 (oil pump 35) and opening and closing of the solenoid valve 43 for the hydraulic pressure control of the piston chamber 15, and changes in an actual hydraulic pressure (hydraulic pressure of the sealed oil passage 49). FIGS. 6(a) to 6(c) are schematic diagrams illustrating states of the hydraulic fluid in the hydraulic circuit 30 for the hydraulic pressure control of the piston chamber 15. FIG. 6(a) is the schematic diagram showing the state of the hydraulic fluid at a time of pressurization. FIG. 6(b) is the schematic diagram showing the state of the hydraulic fluid at a time of holding hydraulic pressure. And, FIG. 6(c) is the schematic diagram showing the state of the hydraulic fluid at a time of decompression.

In pressurizing the piston chamber 15, the hydraulic control device 60 of the present embodiment performs a control (duty-control) to drive the motor 37 (oil pump 35), thereby controlling the piston chamber 15 to reach a target hydraulic pressure on the basis of hydraulic pressure-torque characteristics in pressurizing the piston chamber 15. After pressurizing the piston chamber 15 until reaching the target hydraulic pressure, the hydraulic control device 60 confines the hydraulic fluid into the sealed oil passage 49 until starting decompression. This can keep torque of the clutch 10 substantially constant. On the other hand, in decompressing the piston chamber 15, the hydraulic control device 60 prohibits an operation of the oil pump 35 and controls (on-off-controls) opening and closing of the solenoid valve 43. This controls the piston chamber 15 to reach the target hydraulic pressure on the basis of hydraulic pressure-torque characteristics in decompressing the piston chamber 15. It should be noted that the above-described hydraulic pressure-torque characteristics of the pressurized and decompressed piston chamber 15 are previously modeled as a hydraulic pressure value in the sealed oil passage 49 corresponding to the driving force (rear torque) to be distributed to the rear wheels Wr, Wr.

According to the flow chart of FIG. 4, the procedures of hydraulic pressure controls at the time of pressurization and decompression of the piston chamber 15 will be described below. In the control flow at the time of pressurization as shown in FIG. 4(a), the control unit 50 first determines whether a pressurization instruction (pressurization instruction torque) is given to the piston chamber 15 (step ST1-1). Having determined the driving force distributed to the front wheels Wf, Wf and the rear wheels Wr, Wr according to a running condition of the vehicle, the control unit 50 determines whether the pressurization instruction is given to the piston chamber 15, according to whether fastening of the clutch (driving force distribution device) 10 or an increase in fastening power is required. As a result, on one hand, without the pressurization instruction to the piston chamber 15 (NO), the control unit 50 terminates the procedure. On the other hand, with the pressurization instruction to the piston chamber 15 (YES), the control unit 50 subsequently calculates a hydraulic pressure (instructed hydraulic pressure) for stopping the oil pump 35 (motor 37) on the basis of the hydraulic pressure-torque characteristics of the pressurized piston chamber 15 (step ST1-2). Then, the control unit 50 determines a duty ratio of PWM control for driving the motor 37 from the instructed hydraulic pressure that has been calculated (step ST1-3). Afterwards, if the solenoid valve 43 is open, the control unit 50 closes the solenoid valve 43 to seal the oil passage 49 (step ST1-4), and in turn drives the motor 37 with the determined duty ratio to operate the oil pump 35 (step ST1-5). Consequently, the hydraulic fluid is fed to the oil passage 49 between the one way valve 39 and the piston chamber 15, whereby the hydraulic pressures of the oil passage 49 and the piston chamber 15 rise. Afterwards, the control unit 50 determines whether the hydraulic pressures (actual hydraulic pressures) of the oil passage 49 and the piston chamber 15 detected by the hydraulic pressure sensor 45 have reached equal to or more than the hydraulic pressure (instructed hydraulic pressure) for stopping the oil pump 35 (motor 37) (step ST1-6). If the hydraulic pressures of the oil passage 49 and the piston chamber 15 have reached the hydraulic pressure for stopping the oil pump 35 (YES), the control unit 50 stops the operation of the motor 37 (oil pump 35) (step ST1-7) to terminate the control at the time of pressurization. It should be noted that at this time of the pressurization of the piston chamber 15, until the hydraulic pressures of the oil passage 49 and the piston chamber 15 reach the target hydraulic pressure, the control unit 50 should control to drive the motor 37 so that the oil pump 35 discharges the hydraulic fluid under a constant pressure.

On the other hand, in the control flow at the time of decompression shown in FIG. 4(b), the control unit 50 determines a decompression instruction (decompression instruction torque) is given to the piston chamber 15 (step ST2-1). Having determined the driving force distributed to the front wheels Wf, Wf and the rear wheels Wr, Wr according to a running condition of the vehicle, the control unit 50 determines whether the decompression instruction is given to the piston chamber 15 according to whether fastening release of the clutch (driving force distribution device) 10 or a decrease in fastening power is required. As a result, without the decompression instruction to the piston chamber 15 (NO), the control unit 50 terminates the procedure. On the other hand, with the decompression instruction to the piston chamber 15, the control unit 50 subsequently calculates a hydraulic pressure (instructed hydraulic pressure) for closing the solenoid valve 43 on the basis of hydraulic pressure-torque characteristics of the pressurized piston chamber 15 (step ST2-2). Afterwards, the control unit 50 opens the solenoid valve 43 to release the sealed oil passage 49 (step ST2-3) and in turn controls the hydraulic pressures of the oil passage 49 and the piston chamber 15. Consequently, the hydraulic fluid in the oil passage 49 is discharged via the solenoid valve 43, whereby the hydraulic pressures decrease. Afterwards, the control unit 50 determines whether the hydraulic pressures (actual hydraulic pressures) of the oil passage 49 and the piston chamber 15 detected by the hydraulic pressure sensor 45 have become equal to or less than the hydraulic pressure (instructed hydraulic pressure) for closing the solenoid valve 43 (step ST2-4). If the hydraulic pressures of the oil passage 49 and the piston chamber 15 have reached the hydraulic pressure for closing the solenoid valve 43 (YES), the control unit 50 closes the solenoid valve 43 (step ST2-5) to terminate the control at the time of decompression.

In the timing chart of FIG. 5, at the time of the pressurization from a time T1 to a time T2, the control unit 50 performs the hydraulic pressure control at the time of pressurization according to the flow chart of FIG. 4(a). In this hydraulic pressure control at the time of pressurization, as described above, the control unit 50 controls to drive the oil pump 35 according to the instructed hydraulic pressure, thereby controlling the hydraulic pressure of the piston chamber 15 so as to reach the target hydraulic pressure corresponding to desired torque. In other words, the control unit 50 measures the hydraulic pressure of the hydraulic fluid in the sealed oil passage 49 using the hydraulic pressure sensor 45, and in turn continues to operate the motor 37 and keeps the solenoid valve 43 closed until this hydraulic pressure reaches a value (the target hydraulic pressure) that can output torque to be distributed to the rear wheels Wr, Wr. FIG. 6(a) illustrates the state of the hydraulic fluid in the hydraulic circuit 30 at this time of pressurization.

Afterwards, the control unit 50 stops the operation of the motor 37 (oil pump 35) at the time T2. FIG. 6(b) illustrates the state of the hydraulic fluid in the hydraulic circuit 30 while holding the hydraulic pressure from the time T2 to a time T3. In this state, the hydraulic fluid with the instructed hydraulic pressure is confined in the oil passage 49. Therefore, even if the operation of the oil pump 35 stops, the torque (actual torque) of the clutch 10 is maintained substantially constant for a while. Thus, the target state of four-wheel drive (4WD) continues for a required time. It should be noted that if a higher target hydraulic pressure is set in this state, the control unit 50 further operates the motor 37 to pressurize the oil passage 49, although not shown in the figure.

From the time T3, the control unit 50 performs the hydraulic pressure control at the time of decompression according to the flow chart of FIG. 4(b). In this hydraulic pressure control at the time of pressurization, as described above, the control unit 50 controls the opening and closing of the solenoid valve 43 in accordance with the instructed hydraulic pressure, allowing to control the hydraulic pressure of the piston chamber 15 so as to fall to the target hydraulic pressure corresponding to the desired torque. FIG. 6(c) illustrates the state of the hydraulic fluid in the hydraulic circuit 30 at the time of decompression. In this state, the control unit 50 keeps the solenoid valve 43 open until the sealed oil passage 49 reaches a target hydraulic pressure that is set lower than the target hydraulic pressure corresponding to the desired torque (but higher than a pressure at the time of starting pressurization), and closes the solenoid valve 43 at such target hydraulic pressure. Consequently, the instructed hydraulic pressures of the oil passage 49 and the piston chamber 15 and the instructed torque of the clutch 10 are controlled so as to gradually change at multiple gear positions. A lowered hydraulic pressure of the piston chamber 15 reduces a pressing force of the friction materials 13 and the torque distributed to the rear wheels Wr, Wr. Finally, the hydraulic pressure in the sealed oil passage 49 is lowered to the hydraulic pressure at the time of starting pressurization. This causes a two-wheel drive (2WD) state, in which the driving force is distributed only to the front wheels Wf, Wf.

In this way, the control unit 50 controls the hydraulic pressure supplied from the hydraulic circuit 30, thereby controlling the driving force distributed to the rear wheels Wr, Wr using the clutch 10. Thus, in the drive control, the front wheels Wf, Wf are the main driving wheels and the rear wheels Wr, Wr are the auxiliary driving wheels. In other words, while the clutch 10 is released (disengaged), a rotation of the propeller shaft 7 fails to be transmitted to a rear diff 19 side. Instead, whole torque of the engine 3 is transmitted to the front wheels Wf, Wf, causing the front-wheel drive (2WD) state. On the other hand, while the clutch 10 is engaged, the rotation of the propeller shaft 7 is transmitted to the rear diff 19 side. Consequently, the torque of the engine 3 is distributed to both the front wheels Wf, Wf and the rear wheels Wr, Wr, causing the four-wheel drive (4WD) state. On the basis of detected results using various detection means (not shown tin the figure) for detecting the running condition of the vehicle, the control unit 50 calculates the driving force distributed to the rear wheels Wr, Wr and the hydraulic pressure supplied to the clutch 10 corresponding to this driving force, and in turn outputs a driving signal to the clutch 10 on the basis of these calculation results. This allows to control an engagement force of the clutch 10, thereby controlling the driving force distributed to the rear wheels Wr, Wr.

In the driving force distribution device 70 of the above-described configuration, a change in viscosity of the hydraulic fluid changes shearing resistance and a frictional force of an oil film between plates of the clutch 10. This also changes the torque transmitted to the rear wheels Wr, Wr. Therefore, the value detected from the hydraulic fluid temperature sensor 47 (temperature of the hydraulic fluid) is used as one of parameters for determining a required clutch control hydraulic pressure (target clutch control hydraulic pressure). Here, if the hydraulic fluid temperature sensor 47 functions normally, no problem occurs. However, if an output value becomes abnormal due to a malfunction of the hydraulic pressure sensor 45, a proper target clutch control hydraulic pressure deviates from the target clutch control hydraulic pressure calculated from the various parameters. And, driving in a state in which the target clutch control hydraulic pressure is erroneously calculated might make the behavior of the vehicle unstable. At a low temperature of the hydraulic fluid, in particular, the abnormal output value from the hydraulic fluid temperature sensor 47 may cause excessive torque to gears in the rear diff 19, affecting durability of the gears. In order to prevent such situation, the driving force distribution device 70 of the present embodiment estimates the temperature of the hydraulic fluid using another technique, to be described below, except the hydraulic fluid temperature sensor 47, for determining whether the current temperature of the hydraulic fluid is low.

Namely, in the above-described driving force distribution device 70, a friction coefficient of the clutch 10 becomes large at a low temperature of the hydraulic fluid supplied to the clutch 10. This makes the torque transmitted to the rear wheels Wr, Wr excessive. Due to this, the torque exceeding a target strength of the clutch 10 might occur at the low temperature of the hydraulic fluid. Therefore, in order to prevent the torque exceeding the target strength from occurring to the clutch 10, an estimated temperature of the clutch 10 should be estimated so as to be lower than an actual temperature. And, a controlled amount of the clutch 10 should be limited until the estimated temperature exceeds a specified temperature.

In addition, an extremely high temperature of the clutch 10 carbonizes the friction materials to change characteristics of the friction coefficient of the clutch 10. This might interfere with a transmission of a normal driving force to the rear wheels Wr, Wr. Therefore, an estimated temperature of the clutch 10 is estimated so as to be lower than the actual temperature. And, when this estimated temperature of the clutch 10 exceeds a clutch carbonization temperature, the clutch 10 is released to prevent carbonization of the frictional materials of the clutch 10. From the above-described reasons, the temperature of the hydraulic fluid supplied to clutch 10 is estimated according to a procedure that will be described in detail below.

Figure 7:
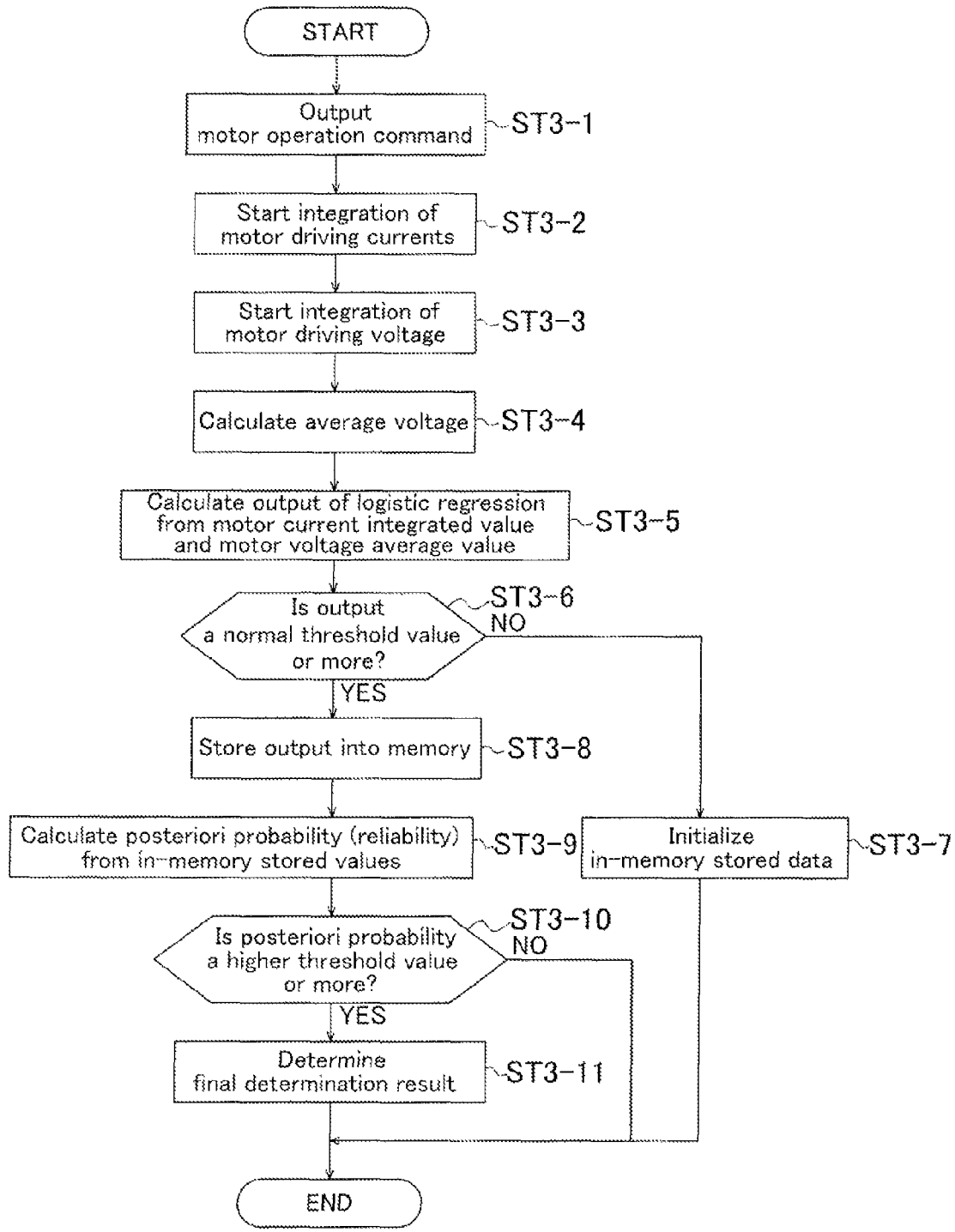
FIG. 7 is a flow chart illustrating a procedure of hydraulic fluid temperature estimation.

The procedure of estimating the temperature of the hydraulic fluid supplied to the clutch 10 in the hydraulic control device 60 of the present embodiment will be described in detail below. FIG. 7 is a flow chart illustrating this procedure of the hydraulic fluid temperature estimation. In the flow chart shown in the same figure, first, the control unit 50 outputs a motor operation command to the motor 37 (ST3-1). Simultaneously, the control unit 50 starts to integrate a motor driving current that is being measured by the control unit 50 (ST3-2), and continues the integration until a predetermined time. Simultaneously, the control unit 50 starts to integrate motor driving voltage that is being measured by the control unit 50 (ST3-2), and calculates an average voltage value after a predetermined time passes (ST3-4).

It should be noted that in duty driving of the motor 37, a voltage value reflecting motor duty is used as the above-described voltage value, whereby the technique for estimating the hydraulic fluid temperature in accordance with the present invention can be applied to the duty-driven motor 37. For instance, the technique of the hydraulic fluid temperature estimation in accordance with the present invention can be applied to a case of a motor duty of 70(%) and a motor driving voltage of 14 (V), using 14×0.7=9.8 (V) as a voltage value V.

After a predetermined time passes, the control unit 5 subsequently uses the integrated current value and the average voltage value as inputs for a logistic regression model and in turn calculates an output (ST3-5).

The logistic regression will be described in detail below. The present technique has devised a binary determination model (determining whether a hydraulic fluid temperature is low) that inputs the integrated value of the motor driving currents and the average value of the motor driving voltage to the logistic regression and then outputs a hydraulic fluid temperature state of the hydraulic fluid. The logistic regression is one of general linearized models and a determination technique that is robust to outliers (values largely deviating from other values). The logistic regression model is expressed by an equation (Equation 1):

$$LOG = \frac{1}{1+\exp(-w'x)}, \quad \text{[Equation 1]}$$

where x is an input data vector;

w is a parameter vector; and

LOG is a posteriori probability of a class.

Here, x is the current integrated value and a two-dimensional vector of the motor driving voltage. LOG is the probability that the hydraulic fluid temperature is equal to or more (or less) than a threshold value.

If the equation (Equation 1) is a normal logistic regression, the output is merely a probability when one data value is input. This increases possibility of an erroneous determination at a lower determination threshold value and makes a determination more difficult at a higher determination threshold. Therefore, in the present embodiment, the technique is introduced for calculating a probability for multiple input data. This enables compatibility of determination accuracy and determination frequency. First, as an extension of the equation (Equation 1), a case of evaluating a posteriori probability will be considered. Given two input data $x_1$ and $x_2$, the posteriori probability is evaluated if the hydraulic fluid temperature is determined to be low for the both data $x_1$ and $x_2$ (expressed as "y=1"). The posteriori probability p (y=1|$x_1$, $x_2$) can be expressed using Bayes' theorem as follows:

$$p(y=1 \mid x_1, x_2) = \frac{p(x_1 \mid y=1)p(x_2 \mid y=1)p(y=1)}{p(x_1, x_2)} \quad \text{[Equation 2]}$$

It is thought that the hydraulic fluid temperature might vary with time even in the same class. Therefore, conditional independence is here assumed for $x_1$ and $x_2$. Next, letting an output of the logistic regression for $x_1$ be $LOG_1$, the output is transformed using Bayes' theorem into:

$$LOG_1 = p(y=1 \mid x_1) = \frac{p(x_1 \mid y=1)p(y=1)}{p(x_1)} \quad \text{[Equation 3]}$$

Similarly, letting an output of the logistic regression for $x_2$ be $LOG_2$, the output is transformed using Bayes' theorem into:

$$LOG_2 = \frac{p(x_2 \mid y=1)p(y=1)}{p(x_2)} \quad \text{[Equation 4]}$$

Furthermore, using the equation (Equation 3) and the equation (Equation 4), the equation (Equation 2) can be expressed as:

$$p(y=1 \mid x_1, x_2) = \frac{LOG_1 \times LOG_2}{p(y=1)} \frac{p(x_1)p(x_2)}{p(x_1, x_2)} \quad \text{[Equation 5]}$$

Also, using a similar calculation, p (y=0|$x_1$, $x_2$) can be expressed as:

$$p(y=0 \mid x_1, x_2) = \frac{(1-LOG_1) \times (1-LOG_2)}{p(y=0)} \frac{p(x_1)p(x_2)}{p(x_1, x_2)} \quad \text{[Equation 6]}$$

On the basis of the equation (Equation 5), the equation (Equation 6) and p (y=1|$x_1$, $x_2$)+p (y=0|$x_1$, $x_2$)=1, the following equation can be derived:

$$\frac{p(x_1)p(x_2)}{p(x_1, x_2)} = \frac{p(y=1)}{LOG_1 \times LOG_2 + (1-LOG_1) \times (1-LOG_2)}$$ [Equation 7]

Since no information related to prior probabilities p (y=0) and p (y=1) can be obtained, p (y=1) is here assumed to be equal to p (y=0). Substitution of the equation (Equation 7) for the equation (Equation 5) leads to the following equation (Equation 8) that can express a posteriori probability given x1, x2:

$$p(y=1 \mid x_1, x_2) = \frac{LOG_1 \times LOG_2}{LOG_1 \times LOG_2 + (1-LOG_1) \times (1-LOG_2)}$$ [Equation 8]

Further, using a similar calculation, a posteriori probability given n input data $(x_1, \ldots x_n)$ can be expressed by:

$$p(y=1 \mid x_1, \ldots, x_2) = \frac{\prod_{i=1}^{n} LOG_i}{\prod_{i=1}^{n} LOG_i + \prod_{i=1}^{n} (1-LOG_i)}$$ [Equation 9]

A threshold value higher than a determination threshold value for the logistic regression is introduced for the equation (Equation 9). Then, a determination result of the equation (Equation 9) is determined to be a final determination result. Thus, only the outputs from the logistic regression model can establish the algorithm that can immediately make a final determination for an input with high reliability and also make a final determination for continuous inputs with normal reliability.

The control unit 50 determines whether the output result of the logistic regression derived from the former step ST3-5 is higher than a normal threshold value (ST3-6). "A normal threshold value" mentioned here is a threshold value for running the logistic regression one time (determination result). As a result, if the output result of the logistic regression is lower than the normal threshold value (NO), the control unit 50 initializes data stored in the memory 58 (ST3-7) to terminate the procedure. It should be noted that the memory 58 is a storage medium for storing output results from running the logistic regression multiple times. On the other hand, if the output result of the logistic regression is higher than the normal threshold value (YES), the control unit 50 stores the output result of the logistic regression calculated on the step ST3-5 in the memory 58 (ST3-8). Afterwards, the control unit 50 calculates a posteriori probability (reliability) given multiple inputs from the output result of the logistic regression stored in the memory 58 (ST3-9), thereby determining whether this calculated posteriori probability is equal to or more than the higher threshold value (ST3-10). "The higher threshold value" mentioned here is a threshold value for determination results for running the logistic regression multiple times. As a result, if the posteriori probability is equal to or more than the high threshold value (YES), the control unit 50 outputs this posteriori probability as a final determination result (ST3-11). On the other hand, if the posteriori probability is less than the higher threshold value (NO), the control unit 50 terminates the procedure without making a final determination result.

Figure 8:
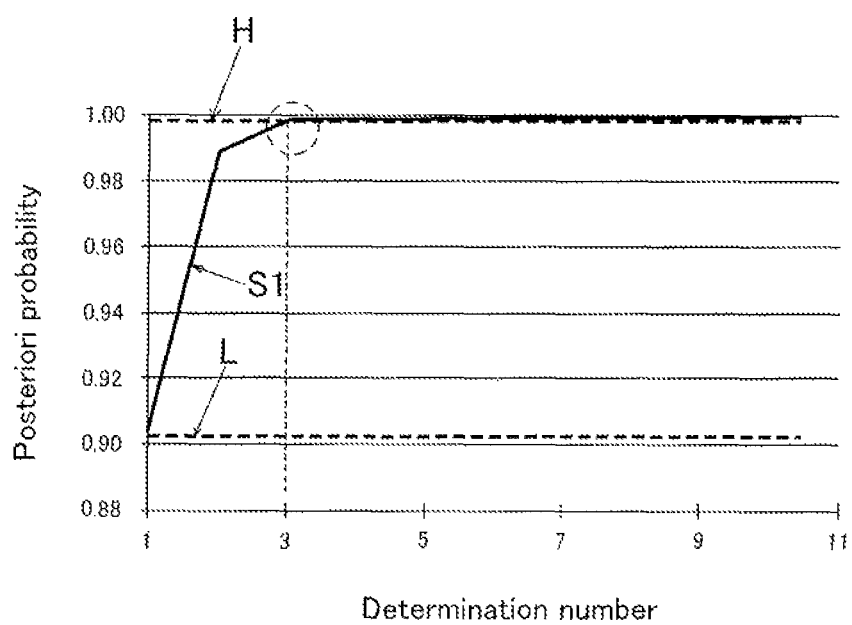
FIG. 8 is a graph illustrating a relation between a number of determinations and a posteriori probability using logistic regression.

FIG. 8 is a graph illustrating a relation between a number of determinations and a posteriori probability using the logistic regression. In the graph of the same FIG., the number of determinations using the logistic regression is plotted on the horizontal axis. And, the posteriori probability (reliability) corresponding to each number of determinations is plotted on the vertical axis. Further, two kinds of threshold values are set. One is a normal threshold value (Normal Probability) L for a determination result for running the logistic regression one time. The other is a high threshold value (High Probability) for multiple-time determination results. On the graph, a line 51 represents the posteriori probability corresponding to each number of determinations (posteriori probability for multiple-time outputs equal to the normal threshold value L). Namely, the two kinds of threshold values are set for the posteriori probability. One is the normal threshold value L. The other is the high threshold value H. In the present case shown on the graph, the posteriori probability (reliability) exceeds the higher threshold value H at the third determination. Thus, the third posteriori probability is determined to be a final determination result.

Figure 9:
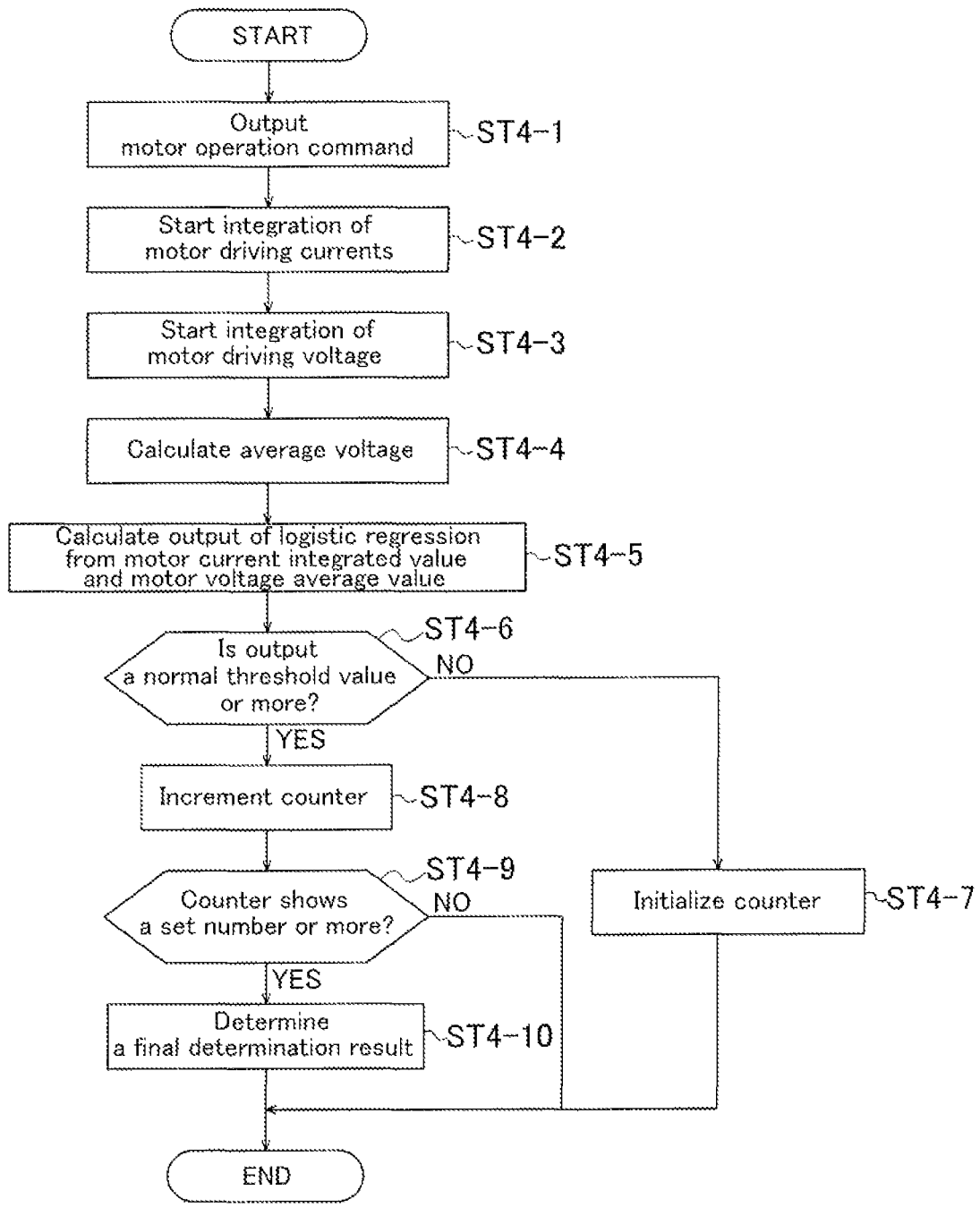
FIG. 9 is a flow chart illustrating another procedure of hydraulic fluid temperature estimation.

FIG. 9 is a flow chart illustrating another procedure of the hydraulic fluid temperature estimation. In comparison with the flow chart shown in FIG. 7, the flow chart shown in FIG. 9 illustrates a procedure of hydraulic fluid temperature control that can improve arithmetic speed without damaging reliability of an output. In this flow chart, first, the control unit 50 outputs a motor operation command to the motor 37 (ST4-1). Simultaneously, the control unit 50 starts to integrate a motor driving current that is being measured by the control unit 50 and continues the integration until a predetermined time (ST4-2). Simultaneously, the control unit 50 starts to integrate motor driving voltage that is being measured by the control unit 50 (ST4-3) and calculates an average voltage value after a predetermined time passes (ST4-4).

After the predetermined time passes, the control unit 50 calculates an output using a current integrated value and the average voltage value as inputs for the logistic regression model (ST4-5). Then, the control unit 50 determines whether the output result of the logistic regression is higher than the normal threshold value (ST4-6). As a result, if the output result of the logistic regression is lower than the normal threshold value L (NO), the control unit 50 initializes the counter (ST4-7) to return to the previous step ST4-1. On the other hand, if the output result of the logistic regression is higher than the normal threshold value L (YES), the control unit 50 increments the counter for counting the number of determinations by 1 (+1). Afterwards, the control unit 50 determines whether the counter for counting the number of determinations is equal to or more than a preset number (number of threshold value) (ST4-9). If the counter shows a number equal to or more than the preset number (YES), the control unit 50 outputs a final determination result (ST4-10). On the other hand, if the counter shows a number less than the preset number (NO), the control unit 50 terminates the processing without determining a final determination result.

In the flow chart shown in FIG. 7, a posteriori probability needs to be calculated from the output result of the logistic regression stored in the memory 58 on the step ST3-9. On one hand, if the output result of the logistic regression exceeds the normal threshold value L on the step ST3-6, which is a step before the step ST3-9, (YES), the control unit 50 stores the output result of the logistic regression in the memory 58. On the other hand, if the output result of the logistic regression is less than the normal threshold value L (NO), the control unit 50 initializes the data stored in the memory 58 to terminate the processing (ST3-7). This is expressed by an equation (Equation 10) as follows:

"Output result of logistic regression"≥"Normal threshold value L" [Equation 10]

Therefore, a following equation (Equation 11) holds:

"Posteriori probability calculated from multiple- [Equation 11]

time outputs " ≥ " posteriori probability for multiple-time outputs equal to normal threshold value "

Suppose that N outputs are given currently and all of the outputs are beyond the normal threshold value. If a "posteriori probability for the N outputs equal to the normal threshold value," the right-hand member in the equation (Equation 11), exceeds the higher threshold value at this N-th time, a "posteriori probability calculated from multiple-time outputs," the left-hand member in the same equation, necessarily exceeds the higher threshold value.

Therefore, in the flow chart shown in FIG. 9, a counter threshold value (set number) on the step ST4-9 is set at N times. This can establish the algorithm of which arithmetic speed is improved without damaging reliability by reducing a calculation amount.

Figure 10:
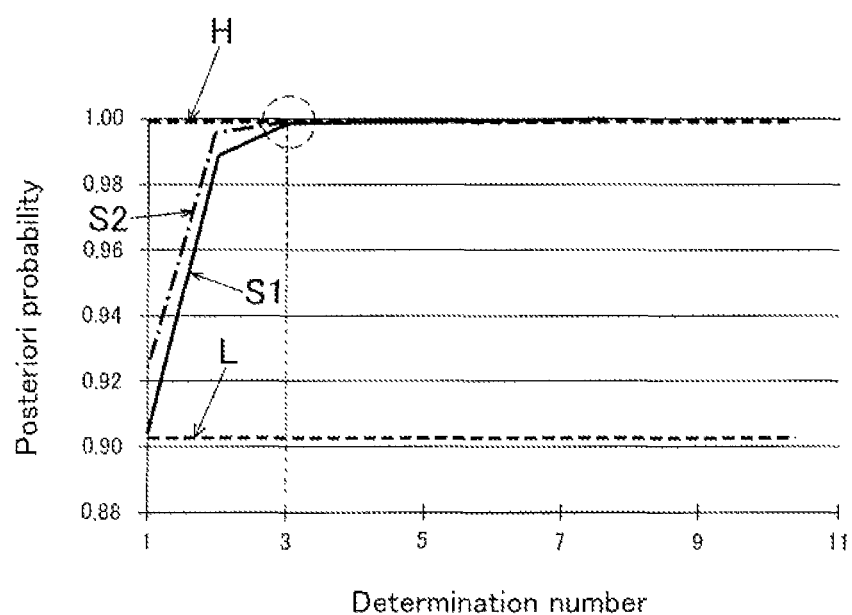
FIG. 10 is a graph illustrating a relation between a number of determinations and posteriori probability using logistic regression.

FIG. 10 is a graph illustrating a relation between a number of determinations and a posteriori probability using the logistic regression. This graph corresponds to the procedure illustrated in the flow chart of FIG. 9. In the graph of FIG. 10, similar to the graph of FIG. 8, the number of determinations using the logistic regression is plotted on the horizontal axis. And, the posteriori probability (reliability) corresponding to each number of determinations is plotted on the vertical axis. Further, two kinds of threshold values are set. One is a normal threshold value (Normal Probability) L for running the logistic regression one time. The other is a high threshold value (High Probability) for multiple-time determination results. On the graph, a line S1 and a line S2 are shown. The line S1 represents a posteriori probability corresponding to a number of determinations (posteriori probability for multiple-time outputs equal to the normal threshold value L). The line S2 represents a posteriori probability calculated from multiple-time outputs. In the case illustrated on this graph, the "posteriori probability for multiple-time outputs equal to the normal threshold value L" exceeds the higher threshold value H at the third determination. Thus, a counter threshold value for the number of determinations should be set as N=3. In this case, the "posteriori probability calculated from multiple-time outputs" necessarily exceeds the higher threshold value H.

The control in accordance with the flow chart shown in FIG. 9 can improve arithmetic speed without damaging reliability of the outputs. Therefore, even given a computer without high performance, a calculation should be performed according to the flow chart in FIG. 9.

And, if the estimated temperature of the hydraulic fluid supplied to the clutch 10 according to the above-described procedure is equal to or less than a first preset temperature, the control unit 50 reduces the hydraulic pressure supplied to the clutch 10 and controls to release the clutch 10. This can prevent a decrease in temperature of the clutch 10 and avoid torque exceeding the target strength from occurring to the clutch 10.

As described above, the above-described driving force distribution device 70 covered by the present invention is a system that performs pressurization by means of the oil pump (motor pump) 35 using the motor 37. Therefore, a correlation exists between the hydraulic fluid temperature and the motor current. Using such correlation, the algorithm has been devised for determining whether the hydraulic fluid temperature is a certain temperature from the integrated value of motor driving currents and the average value of motor driving voltage. For this determination algorithm, the logistic regression is used. Then, the technique has been devised in order to establish the compatibility between determination accuracy and determination frequency. The technique calculates a posteriori probability when determinations are consecutively made multiple times only from an output value of the logistic regression.

As described above, conventional calculation techniques entail a trade-off that a lower determination threshold value increases possibility of an erroneous determination, and a higher determination threshold value makes a determination more difficult. In order to solve such trade-off, the above-described technique has established the algorithm. If multiple data are input, the algorithm calculates a posteriori probability using multiple-time determination results without determining each of the determination results independently. Here, the posteriori probability can be interpreted as reliability of the determination results. Subsequently, the algorithm provides the posteriori probability with a threshold value and in turn makes a final determination. Thus, on one hand, an output determination result with high reliability can be so reliable as to immediately output a final determination result. For an output determination result with normal reliability, on the other hand, a final determination result can be output from multiple-time results. This permits the compatibility between determination accuracy and determination frequency. Specifically, the two kinds of threshold values are set as determination threshold values. The one is the threshold value (normal threshold value) for running the logistic regression one time. The other is the threshold value (higher threshold value) for multiple-time determination results. With these two kinds of threshold values, a determination can be made for both multiple-time determinations exceeding the normal threshold value and a one-time determination exceeding the high threshold value.

In addition, selecting "motor current integrated values" and "motor voltage" as feature quantities can devise the algorithm that can make a highly accurate determination with a linear model with a small calculation load. Such algorithm can output a highly accurate result with a smaller calculation amount compared to any of the conventional techniques.

While the embodiment of the invention has been described, it is to be understood that the invention is not limited to the foregoing embodiment. Rather, the invention can be modified to incorporate any number of variations or alterations within the scope of claims and the scope of technical concept described in the specification and the drawings thereof.

The invention claimed is:
1. A hydraulic control device comprising:
an electric motor;
an oil pump driven by the electric motor; and
a control means configured to control an operation of the electric motor,
wherein the hydraulic control device controls an operation of an actuator using a hydraulic pressure of hydraulic fluid supplied from the oil pump,
the hydraulic control device comprising a hydraulic fluid temperature estimation means configured to estimate a temperature of hydraulic fluid supplied to the actuator, wherein the hydraulic fluid temperature estimation means calculates an output of a logistic regression from an integrated value of driving currents of the electric motor and an average value of driving voltage of the electric motor, and estimates the temperature of the hydraulic fluid based on the calculated output of the logistic regression, and wherein the control means controls the operation of the actuator based on the temperature of the hydraulic fluid estimated using the hydraulic fluid temperature estimation means.

2. The hydraulic control device according to claim 1, wherein the hydraulic fluid temperature estimation means stores the calculated output of the logistic regression equal to or more than a first threshold value into a memory means as a posteriori probability for a given one-time input, determines a posteriori probability to be a final determination result, the posteriori probability equal to or more than a second threshold value larger than the first threshold value, the posteriori probability for given multiple-time inputs calculated from multiple outputs of the logistic regression, the multiple outputs stored in the memory means, and accordingly determines the temperature of the hydraulic fluid to be a predetermined temperature.

3. The hydraulic control device according to claim 2, wherein the actuator is a hydraulic clutch configured to engage using the hydraulic pressure of the hydraulic fluid, and wherein if an estimated temperature of the hydraulic fluid estimated using the hydraulic fluid temperature estimation means is lower than a first temperature, and if the estimated temperature of the hydraulic fluid is equal to or more than a second temperature higher than the first temperature, the control means reduces the hydraulic pressure supplied to the hydraulic clutch and limits a fastening amount of the hydraulic clutch so as to be equal to or less than a predetermined amount.

4. A driving force distribution device for a four-wheel drive vehicle, the driving force distribution device comprising:

a driving force transmission route configured to transmit a driving force from a driving source to main driving wheels and auxiliary driving wheels;

a hydraulic clutch disposed between the driving source in the driving force transmission route and the auxiliary driving wheels, the hydraulic clutch configured to control the driving force distributed to the auxiliary driving wheels; and the hydraulic control device according to claim 3 configured to control an operation of the hydraulic clutch.

5. The hydraulic control device according to claim 1, wherein the actuator is a hydraulic clutch configured to engage using the hydraulic pressure of the hydraulic fluid, and wherein if an estimated temperature of the hydraulic fluid estimated using the hydraulic fluid temperature estimation means is lower than a first temperature, and if the estimated temperature of the hydraulic fluid is equal to or more than a second temperature higher than the first temperature, the control means reduces the hydraulic pressure supplied to the hydraulic clutch and limits a fastening amount of the hydraulic clutch so as to be equal to or less than a predetermined amount.

6. A driving force distribution device for a four-wheel drive vehicle, the driving force distribution device comprising:

a driving force transmission route configured to transmit a driving force from a driving source to main driving wheels and auxiliary driving wheels;

a hydraulic clutch disposed between the driving source in the driving force transmission route and the auxiliary driving wheels, the hydraulic clutch configured to control the driving force distributed to the auxiliary driving wheels; and the hydraulic control device according to claim 5 configured to control an operation of the hydraulic clutch.

* * * * *